United States Patent
Caughman, Jr.

(10) Patent No.: US 7,820,045 B2
(45) Date of Patent: *Oct. 26, 2010

(54) SLUDGE FILTER FOR SEPARATING SLUDGE LIQUIDS FROM SLUDGE SOLIDS

(75) Inventor: Carl Russell Caughman, Jr., Houston, TX (US)

(73) Assignee: Flo Trend Systems, Inc., Houston, TX (US)

( * ) Notice: Subject to any disclaimer, the term of this patent is extended or adjusted under 35 U.S.C. 154(b) by 712 days.

This patent is subject to a terminal disclaimer.

(21) Appl. No.: 11/622,018

(22) Filed: Jan. 11, 2007

(65) Prior Publication Data

US 2008/0169236 A1 Jul. 17, 2008

Related U.S. Application Data

(63) Continuation of application No. 10/376,352, filed on Feb. 27, 2003, now Pat. No. 7,179,377.

(51) Int. Cl.
*B01D 29/05* (2006.01)
(52) U.S. Cl. .................. 210/232; 210/477; 210/489; 210/499
(58) Field of Classification Search ............ 210/232, 210/477, 489, 499
See application file for complete search history.

(56) References Cited

U.S. PATENT DOCUMENTS

| | | | | | |
|---|---|---|---|---|---|
| 4,426,020 | A | * | 1/1984 | Presseau et al. | 222/108 |
| 5,776,567 | A | * | 7/1998 | Schilling et al. | 428/34.5 |
| 5,891,549 | A | * | 4/1999 | Beretta et al. | 428/100 |
| 6,221,120 | B1 | * | 4/2001 | Bennington et al. | 55/385.1 |
| 6,258,268 | B1 | * | 7/2001 | Lake | 210/238 |
| 7,179,377 | B1 | * | 2/2007 | Caughman, Jr. | 210/232 |

* cited by examiner

*Primary Examiner*—Matthew O Savage
(74) *Attorney, Agent, or Firm*—Keeling Patents & Trademarks LLC; Kenneth A. Keeling; Melissa M. Martinez

(57) ABSTRACT

A sludge filter is comprised of a mesh filter media secured to a support net. The support net includes a front surface adjacent the filter media and a rear surface opposite the filter media, the rear surface having a plurality of outwardly extending nodes to define flow channels for horizontal and vertical fluid flow intermediate the net and a container surface. The sludge filter is attached directly to the walls or floor of a container. In a preferred embodiment a border of the sludge filter comprises one part of a two-part fastener system with a second part of the two-part fastener system attached to a container along the perimeter of the filter coverage area, so that the filter medium may be removably attached to the container.

13 Claims, 6 Drawing Sheets

SLUDGE FILTER FOR SEPARATING SLUDGE LIQUIDS FROM SLUDGE SOLIDS

CROSS-REFERENCE TO RELATED APPLICATIONS

This application is a continuation of U.S. patent application Ser. No. 10/376,352, entitled "Filter for Sludge Filtration," filed Feb. 27, 2003, now U.S. Pat. No. 7,179,377.

STATEMENT REGARDING FEDERALLY SPONSORED RESEARCH OR DEVELOPMENT

Not Applicable.

BACKGROUND OF THE INVENTION

1. Field of the Invention

This invention relates generally to sludge filtration systems for separating sludge solids from sludge liquids. More specifically, this invention relates to a filter for use in a container, designed for sludge filtration.

2. Description of the Related Art

The separation of sludge solids from sludge liquid is commonly practiced as an initial step in disposing of waste sludge. Generally, sludge includes, among other things, solid-liquid sludge and slurries such as sewage and industrial waste.

When treating sludge, it is desirable to separate the sludge liquids from the sludge solids for further treatment or recovery or disposal of the solids and liquids separately. A typical filtering system involves a container having filter systems arranged around the container walls and the container floor. Such systems commonly involve a metal, plastic, polypropylene or vinyl liquid-permeable filter mesh with openings such that particulates above a predetermined size do not pass through the filter. Due to the weight of sludge, such filtering systems include a support structure for the filter. The support structure is often comprised of a perforated plate or expanded metal plate. The filter media may be attached to the support structure by retention bars. An opening is typically provided intermediate the support structure and the container wall to provide for drainage of the sludge liquids. Due to the expense of disposable filters, it is desirable that the filter media be relatively strong.

Due to clogging effects of sludge containing small particulates, it is desirable that the filter media be removable for cleaning or replacement. As a result, prior art systems commonly use retainer bars to hold the filters and perforated plate in place. The retainer bars are typically bolted to the support structure. Removal of the filters for washing involves removing the retainer bars. Replacement of the filters involves aligning openings in the filters, perforated plate and support structure. For a large sludge container, such as a commonly practiced roll on roll off container, the weight of the plate and filters increases the difficulty of removal and replacement.

In a typical prior art sludge-dewatering container, the combined width of a support structure and filter is in the range of three inches (~7.5 cm) to six inches (~15 cm). Such prior art filters extend within the container and reduce the volume of sludge that can be processed by the container.

This Applicant's U.S. Pat. No. 5,681,460 teaches a selectively removable sludge filtration system that provides for retrofit into a container and separation of the sludge solids from the sludge liquids therein. This Applicant's U.S. Pat. No. 6,146,528 teaches removable filter assemblies for containers that enable thorough and efficient cleaning of the filter system. U.S. Pat. Nos. 4,929,353 and 5,589,081, issued to Harris, disclose basket-like filter structures. U.S. Pat. No. 4,929,353 teaches a filter that is placed in an existing structure, and is held in place with the weight of the sludge independent any fastening system. U.S. Pat. No. 5,589,081 teaches a removable filter that relies on the hydrostatic pressure created by the mass of sludge to force positive flow of sludge liquids out the drains found in the collection container.

Multiple layer structures for filtering are known in the art. Such filters often comprise a filter media with a support backing to provide lateral rigidity to the filter media. U.S. Pat. No. 5,776,567 to Schilling, et al. teaches a disposable multi-layer filter for separating solid and liquid wastes. U.S. Pat. No. 5,098,364 to Schilling, U.S. Pat. No. 5,110,005 to Schilling, U.S. Pat. No. 5,741,208 to Moak and U.S. Pat. No. 4,385,953 to Beck each teach liners for waste containers. U.S. Pat. No. 5,131,709 to Spica teaches a cargo bed liner system utilizing a plurality of grid-like modules.

It would be an improvement to the art to provide a re-usable sludge filter that does not require a perforated plate, expanded metal or like support structure and that optimizes use of the interior space of a container for sludge filtration.

BRIEF SUMMARY OF THE INVENTION

Accordingly, the objects of my invention is to provide, inter alia, a sludge filtration system that:
   minimizes interior container space required for the filter;
   is attachable to the interior surface of a container;
   is removable for periodic cleaning;
   can be adapted to suit various container shapes and sizes; and
   may be readily removed and replaced.

Other objects of my invention will become evident throughout the reading of this application.

To fulfill such objectives, my invention is a sludge filter comprised of a mesh filter media secured to a support net. The support net includes a front surface adjacent the filter media and a textured rear surface opposite the filter media. The sludge filter is attached directly to the walls or floor of a container. In a preferred embodiment a border of the sludge filter comprises one part of a two-part fastener system with a second part of the two-part fastener system attached to a container along the perimeter of the filter coverage area, so that the filter medium may be removably attached to a container.

DESCRIPTION OF THE INVENTION

Figure 1:
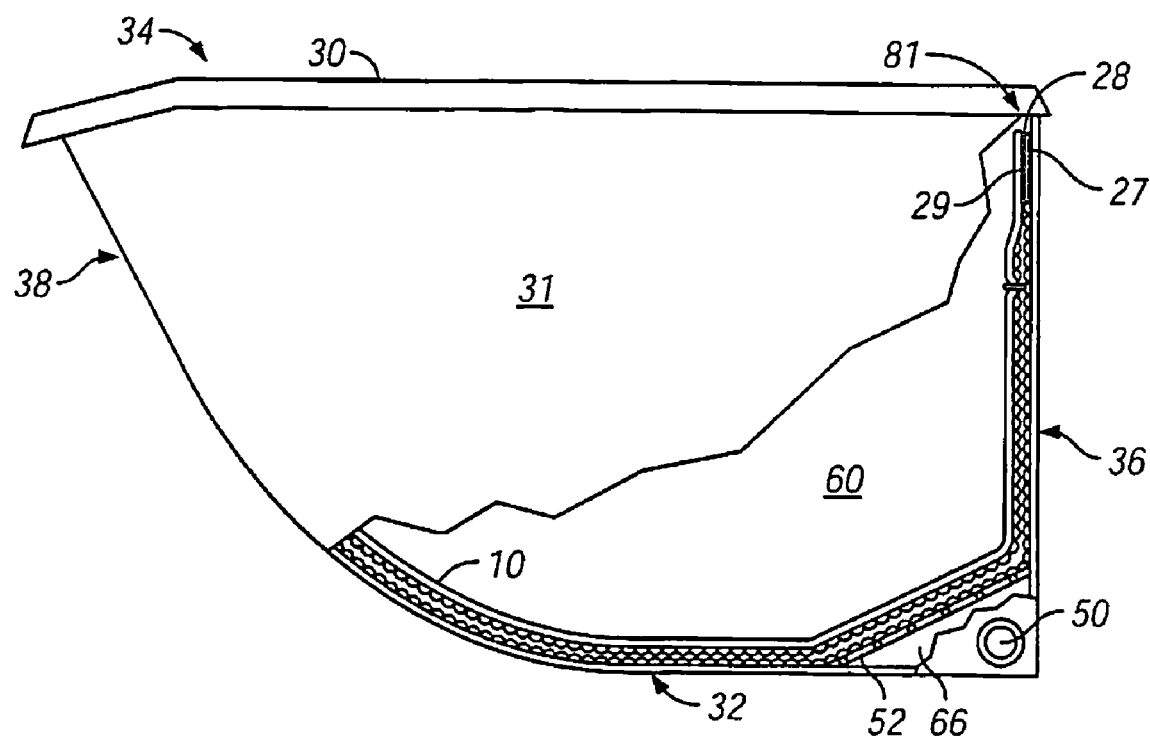
FIG. 1 is a partially cut-away side view of an embodiment of the present system.
Figure 2:
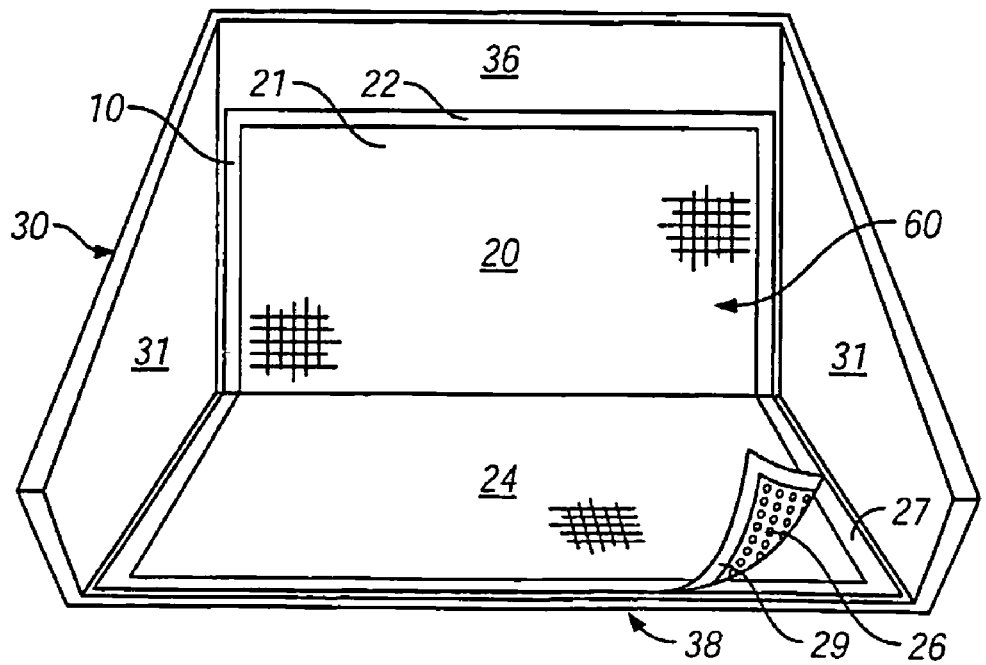
FIG. 2 is a perspective top view of the container of FIG. 1.

Referring to FIGS. 1 and 2, a sludge filter 10 of the present invention is depicted installed in a typical sludge container 30. Referring to FIGS. 1 and 2, a typical container 30 includes a container floor 32, opposed sidewalls 31, a rear wall 36, and a front wall 38. The container floor 32, sidewalls 32, rear wall 36 and front wall 38 are sometimes referred to herein as container 30 surfaces. The top 34 is typically open to receive sludge. A cover, not shown, may be provided.

Figure 3:
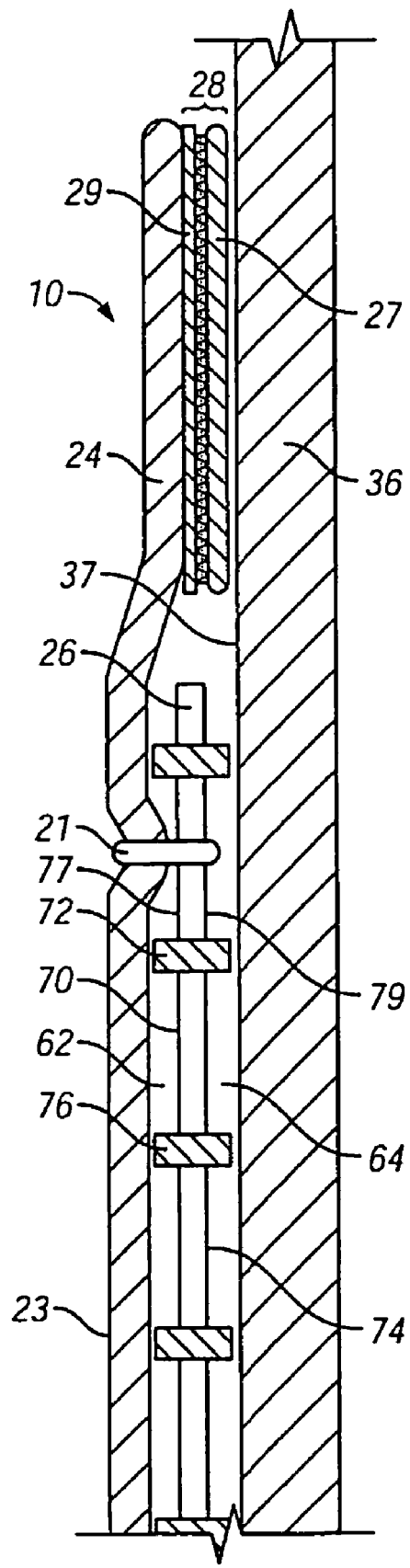
FIG. 3 is a cross-sectional view of the sludge filter.

Referring to FIG. 3, in a cross-sectional view of the sludge filter 10, the sludge filter 10 comprises a filter media 24 and a net 26. In a preferred embodiment, filter media 24 comprises a planar mesh having multiple water-permeable openings extending transversely through the media 24. A preferred material of filter media 24 is a pliable polypropylene, nylon, polyester or wire mesh material.

The openings in filter media 24 may be determined in relation to the maximum size of particulate matter that is acceptable to pass through the filter media 24.

Figure 4:
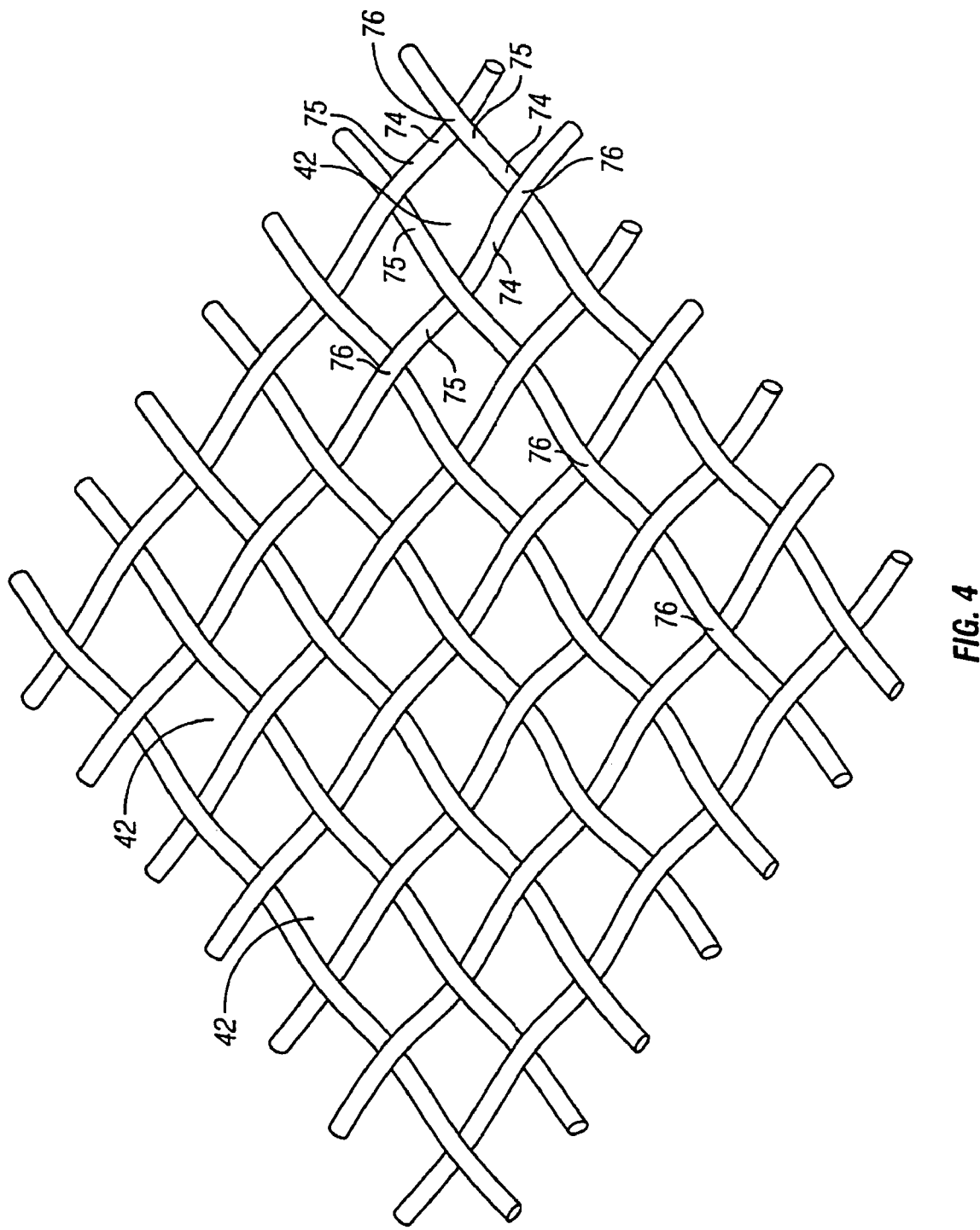
FIG. 4 is a perspective view of a support net.

Referring to FIG. 4, net 26 comprises a generally planar material. Net 26 has perforations 42 transversely through the net 26. The perforations 42 of net 26 are relatively large in comparison to the openings (not shown) of media 24 as net 26 is intended as a support and spacing structure and not as a filtering medium. Net 26 material comprises a relatively rigid material having some flexibility such as polypropylene, nylon, polyester or metal. The net 26 material resists compression in the transverse direction yet is bendable along the plane of the material.

Referring to FIG. 3, net 26 has a front surface 77 and a rear surface 79. In the preferred embodiment, rear surface 79 has a pattern of indented sections 74 and extended nodes 76 relative to the plane of the net 26. Front surface 77 may include a pattern of indented sections 70 and extended nodes 72 relative to the plane of the net 26. For purposes of the sludge filter 10, it is necessary that the rear surface 79 include indented sections 74 and extended nodes 76 to allow flow of filtered sludge liquids between rear surface 79 and container wall surface inner surface 37.

The nodes 76 and indented sections 74 of net rear surface 79 create flow channels 64 intermediate rear surface 79 and wall surface 37. As the nodes 76 and indented sections 74 extend laterally as well as vertically, the nodes 76 and indented sections 74 create multiple, interconnected fluid flow channels 64 intermediate rear surface 79 and wall surface 37, such fluid flow channels 64 allowing liquid flow horizontally and vertically.

The nodes 72 and indented sections 70 of net front surface 77 create flow channels 62 intermediate front surface 77 and filter media 24. As the nodes 72 and indented sections 70 extend laterally as well as vertically, the nodes 72 and indented sections 70 create multiple, interconnected fluid flow channels 62 intermediate front surface 77 and filter media 24, such fluid flow channels 62 allowing liquid flow horizontally and vertically.

Referring to FIG. 3, a thread 21 representing attachment of media 24 to net 26 is depicted. Thread 21 is one of a plurality of threads connection media 24 and net 26.

The depiction of rear wall 36 and inner wall surface 37 in FIG. 3 is typical of a view of sludge filter 10 attached to any wall, floor or support plate of container 30.

Referring to FIG. 4, a form of net 26 is depicted with the back surface 79 up. A plurality of nodes 76 are defined at intersecting net members 75. The indented sections 74 are defined by the net members 75 intermediate nodes 76.

In the preferred embodiment sheets of net 26 and filter media 24 are attached. A preferred method of attachment comprises placing a sheet of net 26 adjacent a sheet of filter media 24 and sewing the net 26 and filter media 24 together with sewn lines (partially represented by thread 21) extending around the perimeter of the sheets and, for large sheets, extending transversely at regular intervals. For appropriate sizes of net 26 and filter media 24, commercially available sewing machines may be utilized to attach filter media 24 and net 26. Alternatively, filter media 24 and net 26 may be attached by staples, glue or a thermal bonding process. In a typical installation, the thickness of net 26 is less than 0.5 inches (~1.25 cm) and the thickness of filter media 24 is less than 0.4 inches (~1.0 cm).

Referring to FIGS. 1, 3, 5, 6 and 7, in positioning sludge filter 10 in container 30, net 26 is intermediate filter media 24 and an inner surface 37 of container wall 36. In such position, sludge (not shown) introduced into container 30 will be disposed proximate surface 23 of filter media 24. Accordingly, sludge liquids will pass through filter media 24 under pressure of gravity and the mass of the sludge and sludge solids (above a predetermined particle size) will not pass through filter media 24.

In a preferred embodiment, container 30 is provided with a drain cavity 66 defined by rear wall 36, sidewalls 31, floor 32 and a cavity grate 52. Cavity grate 52 is positioned within container 30, adjacent to floor 32, and is constructed out of a sturdy perforated material resistant to deformation under the weight of a container full of sludge. In an exemplary embodiment cavity grate is formed from perforated metal. Preferably, drain cavity 66 is positioned at the lowest section of container 30. A drain 50 extends through sidewall 31. Drain 50 is connectable to a drain line (not shown). The drain line typically is connectable at drain 50 and includes a valve for controlled release of sludge liquids for transmittal for disposal or further processing. Drain 50 may be located in floor 32 or rear wall 36 as desired depending on the orientation of the container 30.

Referring to FIG. 3, in the preferred embodiment, sludge filter 10 is removably attached to container 30 by a two-part fastener system 28 extending around the perimeter of the sludge filter 10. An exemplary embodiment uses a hook and loop fastener system (e.g., a Velcro® type fastener—Velcro® is a registered trademark of Velcro Industries B.V.) for fastener system 28. A first fastener component 27 of the hook and loop fastener system is bonded to the interior surface 37 of container 30. A second fastener component 29 is attached to filter media 24.

In an exemplary embodiment, the net 26 is sized with smaller lateral dimensions than the filter media 24 sheet leaving a peripheral segment of filter media 24 extending around the sludge filter 10 outside net 26. The fastener component 29 is attached to the filter media 24 at such peripheral segment. This allows the thickness around the perimeter of the sludge filter 10 to be the sum of the thickness of the filter media 24, first fastener component 27 and second fastener component 29.

First fastener portion 27 is attached to the inner surfaces 37 of container 30 along the perimeter of container 30 onto which sludge filter 10 is to be mounted. In the embodiment of FIGS. 1 and 2, the sections of container 30 onto which sludge filter 10 is to be mounted include rear wall 36, cavity grate 52, floor 32 and front wall 38.

In the case of sections of container 30 that are proximate to container top 34, a protective bar 81 may be attached to container 30. Protective bar 81 prevents sludge (not shown) from dislodging the upper edges of second fastener component 29 from first fastener component 27.

Alternatively, the sludge filter 10 may be attached to the container 30 by a plurality of retainer bars (not shown), such bars bolted, or otherwise fixed to said container. Alternatively, the sludge filter 10 may be attached to the container 30 by a plurality of washers (not shown) held in place by screws or bolts (not shown). The use of retainer bars, bolts and washers is known in the art for attaching prior art filters to a container 30, and may be readily adapted for use with the filter 10 of the present invention.

Referring to FIGS. 1, 3 and 4, when sludge (not shown) is deposited in container 30, sludge is disposed against sludge filter 10 in contact with filter media 24. Filter media 24 permits that passage of sludge liquids, while impeding the passage of sludge solids (not shown) of a predetermined size based on perforation size in filter media 24. Sludge liquids that pass through filter media 24 flow through perforations 42 of net 26 and through the various openings defined by indented sections 74 and rear wall surface 37. In like manner, sludge liquids would flow through channels 64 between indented sections 74 and the inner surface (not show) of front wall 38 and floor 32. As indented sections 74 allow vertical and horizontal flow intermediate rear surface 79 and inner rear wall surface 37, the liquids eventually gravity-flow downward to drain cavity 66. In a net 26 having nodes 72 and indentations 70 of net front surface 77, liquids additionally flow through channels 62 intermediate net front surface 77 and filter media 24.

In a preferred embodiment, sludge liquids are collected in drain cavity 66. Drain 50 is selectively opened to permit the evacuation of sludge liquids from drain cavity 66. Drain 50 is located in floor 32 in the embodiment of FIG. 1. Drain 50 may comprise a plurality of drains and may be located, as appropriate in floor 32 or in a rear, side or front wall of container 30 as appropriate.

After sludge liquids are separated from sludge solids, and sludge solids are removed from container 30, sludge filter 10 may be removed from container 30 by separating first fastener component 27 and second fastener component 29 of two-part fastener system 28 and pulling sludge filter 10 from container 30. Sludge filter 10 may be cleaned, inspected and repaired, then re-inserted into container 30 for subsequent use.

Figure 5:
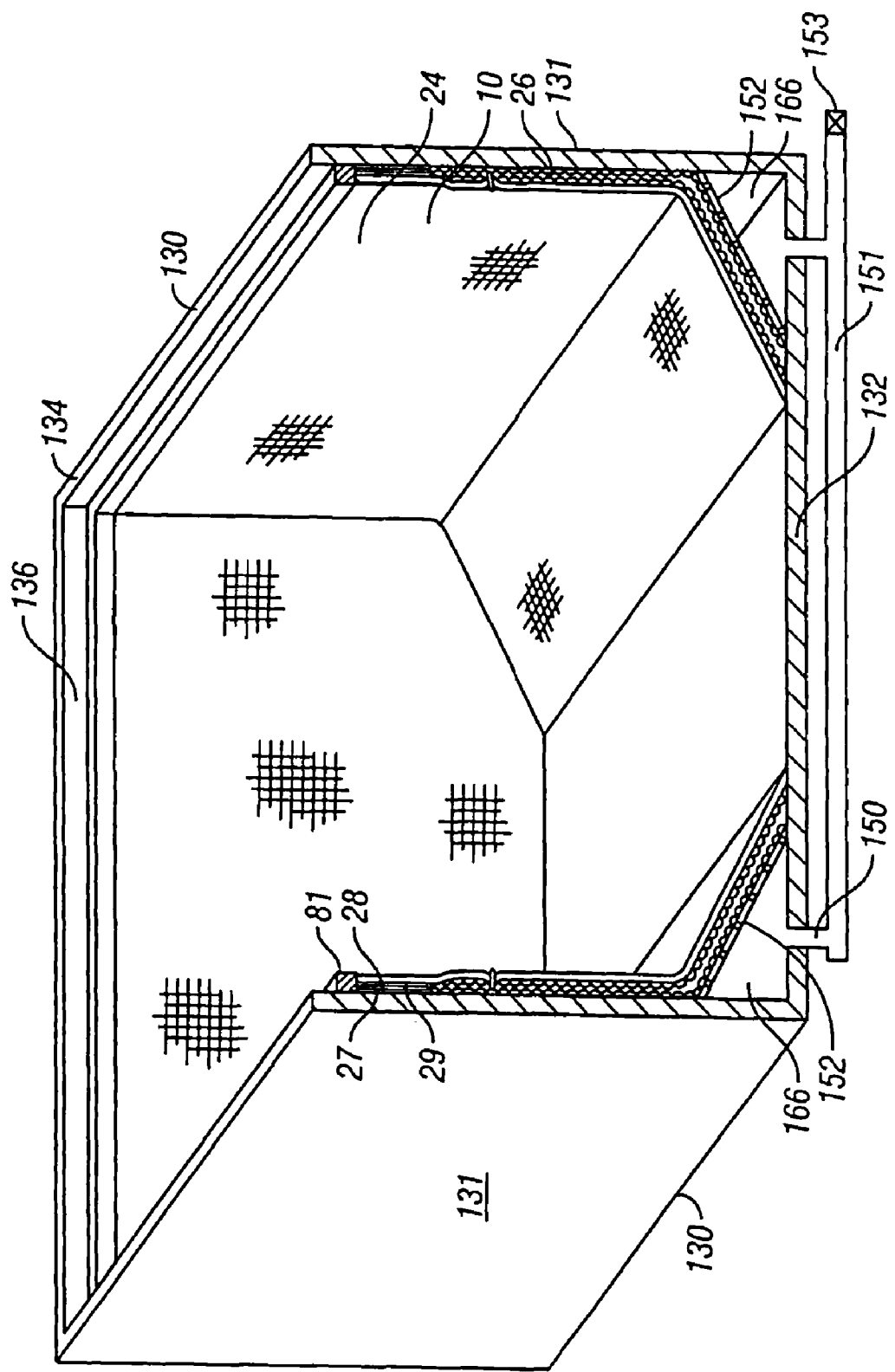
FIG. 5 is a cross-sectional view of the sludge filter disposed in a typical rectangular container.

Referring now to FIG. 5, the sludge filter 10 of the present invention is depicted in a typical rectangular container 130. Container 130 includes a container floor 132, opposed sidewalls 131, a rear wall 136, and a front wall (not shown). The top container surface 134 is typically open to receive sludge. A cover, not shown, may be provided which seals container at top surface of 134.

Container 130 is provided with two drain cavities 166, each defined by rear wall 136, sidewalls 131, floor 132 and a cavity grate 152. If applicable, an end (not shown) of each drain cavity 166 is defined by a front wall (not shown). In practice, the front wall of container 130 comprises a gate that may be selectively opened. Accordingly, a partition (not shown) defines a front wall of the drain cavity 166.

Each cavity grate 152 is positioned within container 130 adjacent to floor 132, and is constructed out of a sturdy perforated material. Preferably, each drain cavity 166 is positioned at the lowest section of container 130. A drain 150 extends through floor 132 at each drain cavity 166. Each drain 150 may be connected to manifold line 151. Manifold drain line 151 is typically connected at drains 150 and includes a valve 153 for controlled release of sludge liquids for transmittal for disposal or further processing. Drains 150 may be alternatively located in sidewalls 131 or rear wall 136 as desired. A plurality of drains 150 may be provided for each drain cavity 166. A plurality of manifold drain lines 151 may be provided.

In the embodiment of FIG. 5, filter media 24 and net 26 are depicted arranged along sidewalls 131 and rear wall 136. Sludge liquids (not shown) migrate horizontally and vertically intermediate filter media 24 and sidewalls 131 and rear wall 136 as previously described herein. A drain cavity may be provided along rear wall 136. However, a drain cavity is not required if the sludge filter 10 positioned on rear wall 136 is in fluid communication with drain cavities 166. Alternatively, the sludge filter 10 may be disposed only along sidewalls 131.

As in the embodiment of FIGS. 1, 2 and 3, sludge filter 10 is removably attached to container 130 by a two part fastener system 28 extending around the perimeter of the sludge filter 10 with first fastener portion 27 of a hook and loop fastener system bonded to the interior surface of container 30 as a first fastener component 27 and the fastener component 29 attached to filter media 24. A protective bar 81 is attached to container 30 at the upper edge of sludge filter 10 to prevent sludge (not shown) from dislodging the upper edges of fastener component 29 from first fastener component 27.

Figure 6:
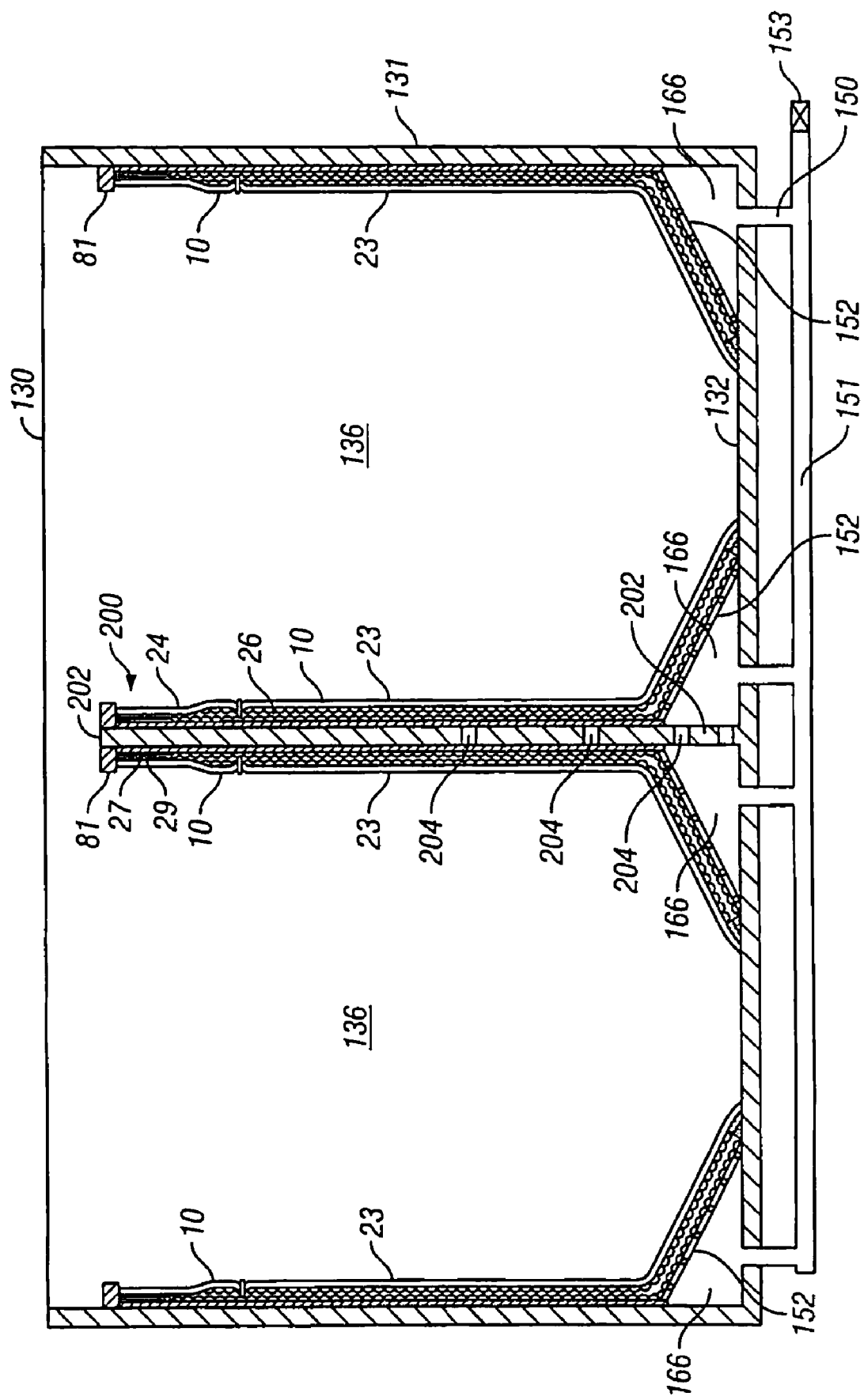
FIG. 6 is a cross-sectional view of the sludge filter disposed in a container and including a vertical center filter panel.

Referring now to FIG. 6, the sludge filter 10 of the present invention is depicted in a typical rectangular container 130 together with a center filter section 200. Container 130 includes a container floor 132, opposed sidewalls 131, a rear wall 136 and a front wall (not shown). Container 130 is provided with four drain cavities 166. The drain cavities adjacent sidewalls 131 are each defined by rear wall 136, sidewalls 131, floor 132, a cavity grate 152 and a front wall (not shown) or partition (not shown) as described in relation to FIG. 5.

The center filter section 200 includes a vertical support plate 202. Support plate 202 extends vertically upward from floor 132. A sludge filter 10 is attached to each side of support plate 202 in the manner of attachment of sludge filter 10 to container 130 side walls 131 as described in relation to FIGS. 1, 2 and 5. Accordingly, center filter section 200 provides additional filter capacity within container 130. Drain cavities 166 of center filter section 200 are each defined by rear wall 136, support plate 202, floor 132, a cavity grate 152 and a front wall (not shown) or partition (not shown). A plurality of apertures 204 may be provided in support plate 202 to provide fluid communication through support plate 202.

A drain 150 extends through floor 132 at each drain cavity 166. Each drain 150 may be connected to a manifold drain line 151. Each manifold drain line 151 typically is connected at drain 150 and includes a valve 153 for controlled release of sludge liquids for transmittal for disposal or further processing. A plug (not shown) may be provided in lieu of valve 153. A plurality of drains 150 may be provided for each drain cavity 166. A plurality of manifold drain lines 151 maybe provided.

In the embodiment of FIG. 6, sludge filter 10 is depicted arranged along sidewalls 131 and support plate 202. Sludge liquids (not shown) migrate horizontally and vertically intermediate filter media 24 and sidewalls 131 and intermediate filter media 24 and support plate 202 as previously described herein.

As in the embodiment of FIGS. 1, 2, 3 and 5, sludge filter 10 is removably attached to container 130 by a two part fastener system 28 extending around the perimeter of the sludge filter 10 with first fastener portion 27 of a hook and loop fastener system bonded to the interior surface of container 131 as a first fastener component 27 and the fastener component 29 attached to filter media 24. A protective bar 81 is attached to container 131 at the upper edge of sludge filter 10 to prevent sludge (not shown) from dislodging the upper edges of fastener component 29 from first fastener component 27.

Figure 7:
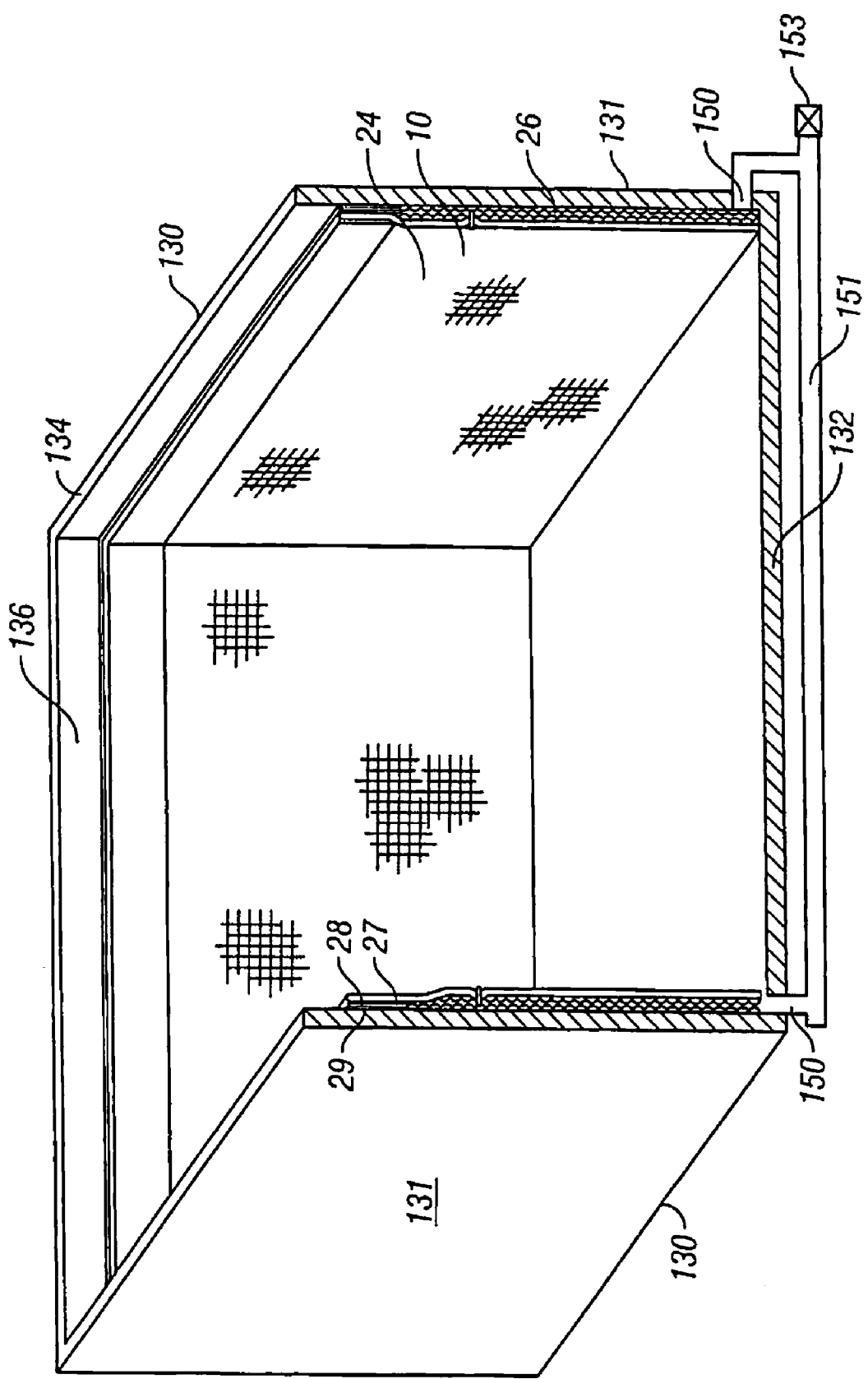
FIG. 7 is a cross-sectional view of the sludge filter disposed in a typical rectangular container.

Referring to FIG. 7, sludge filter 10 is depicted arranged along sidewalls 131. The embodiment of FIG. 7 does not include a support plate or a defined drain cavity 166. In the embodiment of FIG. 7, drains 150 extend through floor 132 and sidewall 131 proximate floor 132. Each drain 150 may be connected to a manifold drain line 151. Each manifold drain line 151 typically is connected at drain 150 and includes a valve 153 for controlled release of sludge liquids for transmittal for disposal or further processing. A plug (not shown)

may be provided in lieu of valve 153. A plurality of drains 150 may be provided for each drain cavity 166. A plurality of manifold drain lines 151 may be provided.

Sludge liquids (not shown) migrate horizontally and vertically intermediate filter media 24 and sidewalls 131 and intermediate filter media 24 as previously described herein.

As in the embodiment of FIGS. 1, 2, 3 and 5, sludge filter 10 is removably attached to container 130 by a two part fastener system 28 extending around the perimeter of the sludge filter 10 with first fastener portion 27 of a hook and loop fastener system bonded to the interior surface of container 131 as a first fastener component 27 and the fastener component 29 attached to filter media 24.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A sludge container for separating sludge liquids from sludge solids, comprising:
    at least one container wall and a container floor;
    said at least one container wall defining a container interior surface;
    a sludge filter comprising a filter media and a filter net;
    said filter media comprising a planar sheet having a media front surface and a media rear surface with transverse media openings extending from said media front surface to said media rear surface;
    said filter net comprising a planar net having a net front surface and a net rear surface with transverse net perforations extending from said net front surface to said net rear surface;
    said media openings liquid permeable;
    said media openings limited to a predetermined size;
    said net perforations larger than said media openings;
    said net rear surface comprising a plurality of rear surface nodes and a plurality of rear surface indented sections;
    said net rear surface adjacent a container interior surface;
    a drain;
    said net perforations in fluid communication with said drain;
    a first attachment component of a hook and loop fastener system extending around a perimeter of said filter media;
    a second attachment component of a hook and loop fastener system attached to at least part of said container inner surface; and
    said first attachment component of a hook and loop fastener system alignable with said second attachment component of a hook and loop fastener system.

2. A sludge container according to claim 1 further comprising:
    said net perforations, said plurality of rear surface nodes and said plurality of rear surface indented sections defining a plurality of flow channels intermediate said net rear surface and said container interior surface; and
    said flow channels allowing horizontal and vertical fluid flow.

3. A sludge container according to claim 2 further comprising:
    said drain in fluid communication with said flow channels.

4. A sludge container according to claim 2 further comprising:
    said container having a drain cavity;
    said flow channels in fluid communication with said drain cavity; and
    said drain in fluid communication with said drain cavity.

5. A sludge container according to claim 1 further comprising:
    said net front surface comprising a plurality of front surface nodes and a plurality of front surface indented sections;
    said net perforations, said plurality of front surface nodes and said plurality of front surface indented sections defining a plurality of front flow channels intermediate said net front surface and said media rear surface.

6. A sludge container according to claim 5 further comprising:
    said drain in fluid communication with said front flow channels.

7. A sludge container according to claim 5 further comprising:
    said container having at least one drain cavity;
    said front flow channels in fluid communication with said at least one drain cavity; and
    said drain in fluid communication with said at least one drain cavity.

8. A sludge container according to claim 7 further comprising:
    said sludge filter selectively attachable to and removable from said container interior surface.

9. A sludge container according to claim 5 further comprising:
    said sludge filter selectively attachable to and removable from said container interior surface.

10. A sludge container according to claim 1 further comprising:
    said filter media sewn to said net.

11. A sludge container for separating sludge liquids from sludge solids, comprising:
    at least one container wall and a container floor;
    said at least one container wall defining a container interior surface;
    a sludge filter comprising a filter media and a filter net;
    said filter media comprising a liquid-permeable planar sheet having media openings;
    said filter net comprising a planar net having a net front surface and a net rear surface with transverse net perforations;
    said filter net comprising a plurality of nodes and a plurality of surface indented sections;
    at least one drain;
    said net perforations in fluid communication with said at least one drain;
    a first attachment component of a hook and loop fastener system extending around a perimeter of said filter media;
    a second attachment component of a hook and loop fastener system attached to at least part of said container inner surface; and
    said first attachment component of a hook and loop fastener system alignable with said second attachment component of a hook and loop fastener system.

12. A sludge container according to claim 11 further comprising:
    said container having at least one drain cavity;
    said net perforations in fluid communication with said at least one drain cavity; and
    said drain in fluid communication with said at least one drain cavity.

13. A sludge container according to claim 11 further comprising:
    said sludge filter selectively attachable to and removable from at least a portion of said container interior surface.

* * * * *